US006705367B1

United States Patent
Kobayashi

(10) Patent No.: US 6,705,367 B1
(45) Date of Patent: Mar. 16, 2004

(54) HEAVY DUTY PNEUMATIC RADIAL TIRE INCLUDING LUG GROOVE HAVING PLATFORM

(75) Inventor: Kazuomi Kobayashi, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/629,047

(22) Filed: Jul. 28, 2000

(30) Foreign Application Priority Data

Jul. 29, 1999 (JP) ............................ 11-214820

(51) Int. Cl.$^7$ .................... B60C 11/13; B60C 103/00
(52) U.S. Cl. ...................... 152/209.22; 152/209.13
(58) Field of Search .................... 152/209.1, 209.12, 152/209.13, 209.22, 209.19

(56) References Cited

U.S. PATENT DOCUMENTS

| D72,636 S | * | 5/1927 | Reichard |
| 1,767,502 A | * | 6/1930 | Anderson |
| D168,494 S | * | 12/1952 | Beckman |
| 3,457,981 A | * | 7/1969 | Verdier |
| 3,467,159 A | * | 9/1969 | Semonin |
| 4,202,391 A | * | 5/1980 | Shibayama et al. |
| 4,595,042 A | * | 6/1986 | Nishio et al. |
| 4,830,077 A | * | 5/1989 | Goto et al. |

FOREIGN PATENT DOCUMENTS

| JP | 5-286419 | * | 11/1993 |
| JP | 6-87302 | * | 3/1994 |
| JP | 11-139113 | * | 5/1999 |

* cited by examiner

Primary Examiner—Steven D. Maki
(74) Attorney, Agent, or Firm—Sughrue Mion, PLLC

(57) ABSTRACT

In a heavy duty pneumatic radial tire having a lug pattern formed on both sides of a tread portion, each of lug grooves forming lugs is extended from a position separated from an equatorial plane of the tire by a given distance up to each of tread ends and has a platform on a region ranging from a top end portion near to the equatorial plane to a central portion in a longitudinal direction of the lug groove so as to satisfy such a surface shape that a groove depth at the top end portion is made shallower than a groove depth at the central portion.

2 Claims, 3 Drawing Sheets

HEAVY DUTY PNEUMATIC RADIAL TIRE INCLUDING LUG GROOVE HAVING PLATFORM

BACKGROUND OF THE INVENTION

1. Field of the Invention

This invention relates to heavy duty pneumatic radial tires, particularly a pneumatic radial tire for construction vehicles having a lug pattern, and more particularly to a heavy duty pneumatic radial tire improving a crack resistance at groove bottom in a lug groove for the formation of lug and a resistance to chunk-out from a bottom of a lug groove in a tread rubber while maintaining wear resistance, traction performance, resistance to heat build-up and the like.

2. Description of Related Art

The heavy duty pneumatic radial tires, particularly pneumatic radial tires for construction vehicle are required to ensure traction performance and gripping performance in the running on a non-paved road surface, so that a lug pattern is frequently adopted.

Since a large driving torque is applied to a tread portion of a tire mounted onto a driving shaft of the construction vehicle, there is frequently caused a chance of creating cracks at a groove bottom of a lug groove for the formation of a lug. In order to prevent the occurrence of the crack, there are used a way that a radius of curvature in the groove bottom at a section of the lug groove in a direction perpendicular to the lug groove is made large to disperse strain or stress and the like.

If the crack is created in the groove bottom, there is sometimes caused a failure that the lug is chunked out from the belt (chunking of rubber lump) due to the growth of the crack in the running of the tire. This failure is countered by increasing a gauge of a skid base. And also, such an increase of the gauge has an effect of raising disposal limit of tread rubber due to the wearing.

However, the increase of the radius of curvature in the groove bottom for preventing the occurrence of cracks at the groove bottom of the lug groove is regulated by the width of the lug groove and is naturally critical, so that the satisfactory effect can not be obtained by such a way.

And also, the increase of the gauge in the skid base is an increase of gauge in the tread rubber as a whole, which brings about the increase of heat build-up and rise of temperature in the tread rubber and finally degrades the resistance to heat build-up in the tire. Therefore, such an increase of the gauge is unsuitable for tires used under a high-speed running condition.

SUMMARY OF THE INVENTION

It is, therefore, an object of the invention to provide a heavy duty pneumatic radial tire capable of advantageously improving both crack resistance at the bottom of the lug groove and resistance to chunk-out while maintaining traction performance and resistance to heat build-up at conventional levels.

According to the invention, there is the provision of in a heavy duty pneumatic radial tire having a lug pattern formed on both sides of a tread portion, the improvement wherein each of lug grooves forming lugs is extended from a position separated from an equatorial plane of the tire by a width $L_0$ corresponding to 3–15% of a ground contact width up to each of both ends of a tread portion and opened at such a tread end, and the lug groove has a platform on either a continuous region ranging from a top end portion near to the equatorial plane to a central portion in a longitudinal direction of the lug groove and connecting the top end portion to the central portion or a division region separated the top end portion and the central portion from each other, and the platform has such a surface shape that a groove depth at the top end portion is made shallower than a groove depth at the central portion.

The term "ground contact width" used herein is according to the definition of "ground contact width" described on "Chapter G: General Information" of JATMA YEAR BOOK 1999, "Section 4" of The Tire and Rim Association, Inc.-1999 and Standard Manual-1999, Earthmoving Equipment Tyres of European Tyre and Rim Technical Organization, provided that "required air pressure" in the same chapter is a maximum air pressure of the respective tire and "required mass" is a mass of a maximum load capacity.

In a preferable embodiment of the invention, the platform located on the continuous region connecting the top end portion of the lug groove to the central portion thereof has such a surface shape that the groove depth of the lug groove is gradually increased from a start end of the top end portion toward an upper edge of a terminal end of the central portion.

In another preferable embodiment of the invention, the platform located on the continuous region or the division region at the side of the top end portion is existent in such a place that a ratio of distance $L_1$ on a vertical line drawn from the position of the top end of the lug groove to the tread end to a vertical distance L ranging from the position of the top end of the lug groove to the tread end corresponding to an end of a ground contact width in a ground contact face of the tread portion is within a range of 0.1–0.2 and satisfies such a condition that a ratio of height $h_1$ of the platform from a bottom line of the lug groove to height $H_1$ from the bottom line to the ground contact face on a normal line drawn to the ground contact face is within a range of 0.2–0.6.

In the other preferable embodiment of the invention, the platform located on the continuous region or the division region at the side of the central portion is existent in such a place that a ratio of distance $L_2$ on a vertical line drawn from the position of the top end of the lug groove to the tread end to a vertical distance L ranging from the position of the top end of the lug groove to the tread end corresponding to an end of a ground contact width in a ground contact face of the tread portion is within a range of 0.2–0.5 and satisfies such a condition that a ratio of height $h_2$ of the platform from a bottom line of the lug groove to height $H_2$ from the bottom line to the ground contact face on a normal line drawn to the ground contact face is within a range of 0.1–0.4.

BRIEF DESCRIPTION OF THE DRAWINGS

The invention will be described with reference to the accompanying drawings, wherein.

DESCRIPTION OF PREFERRED EMBODIMENTS

Figure 1:
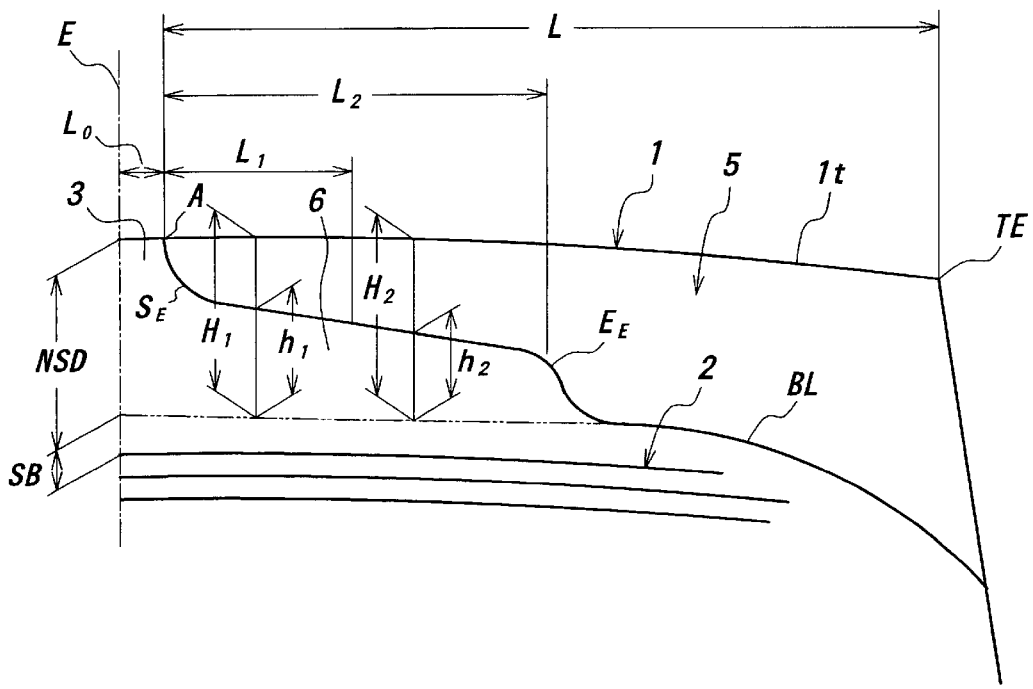
FIG. 1 is a diagrammatically right-half section view of a main part in a first embodiment of the tire according to the invention.
Figure 2:
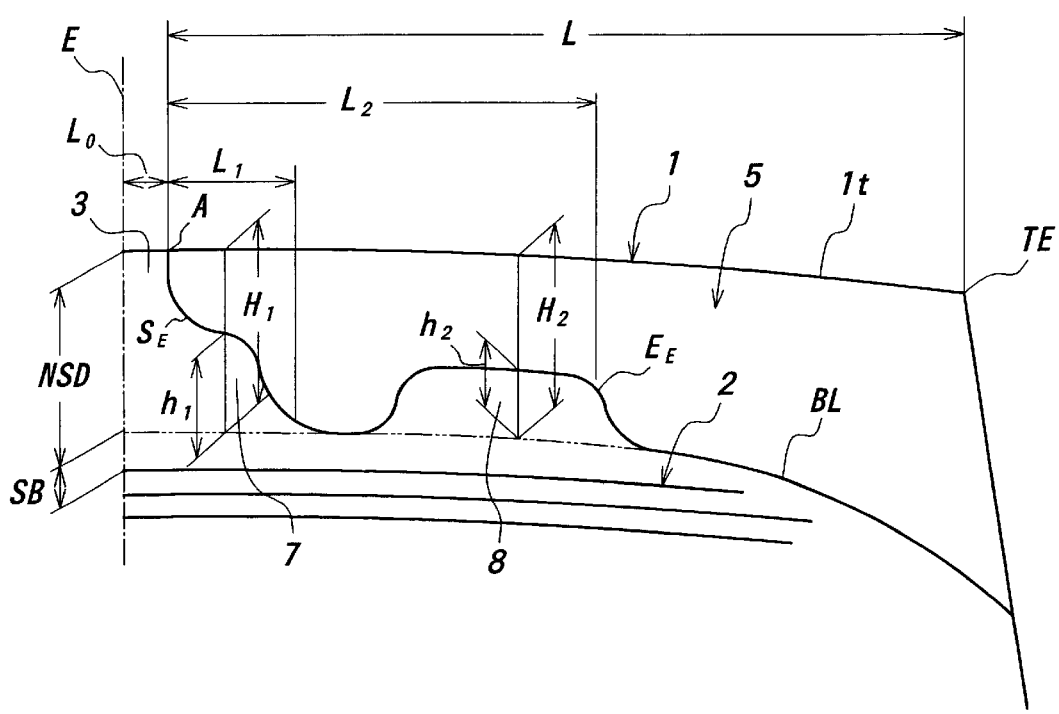
FIG. 2 is a diagrammatically rigbt-half section view of a main part in a second embodiment of the tire according to the invention.
Figure 3:
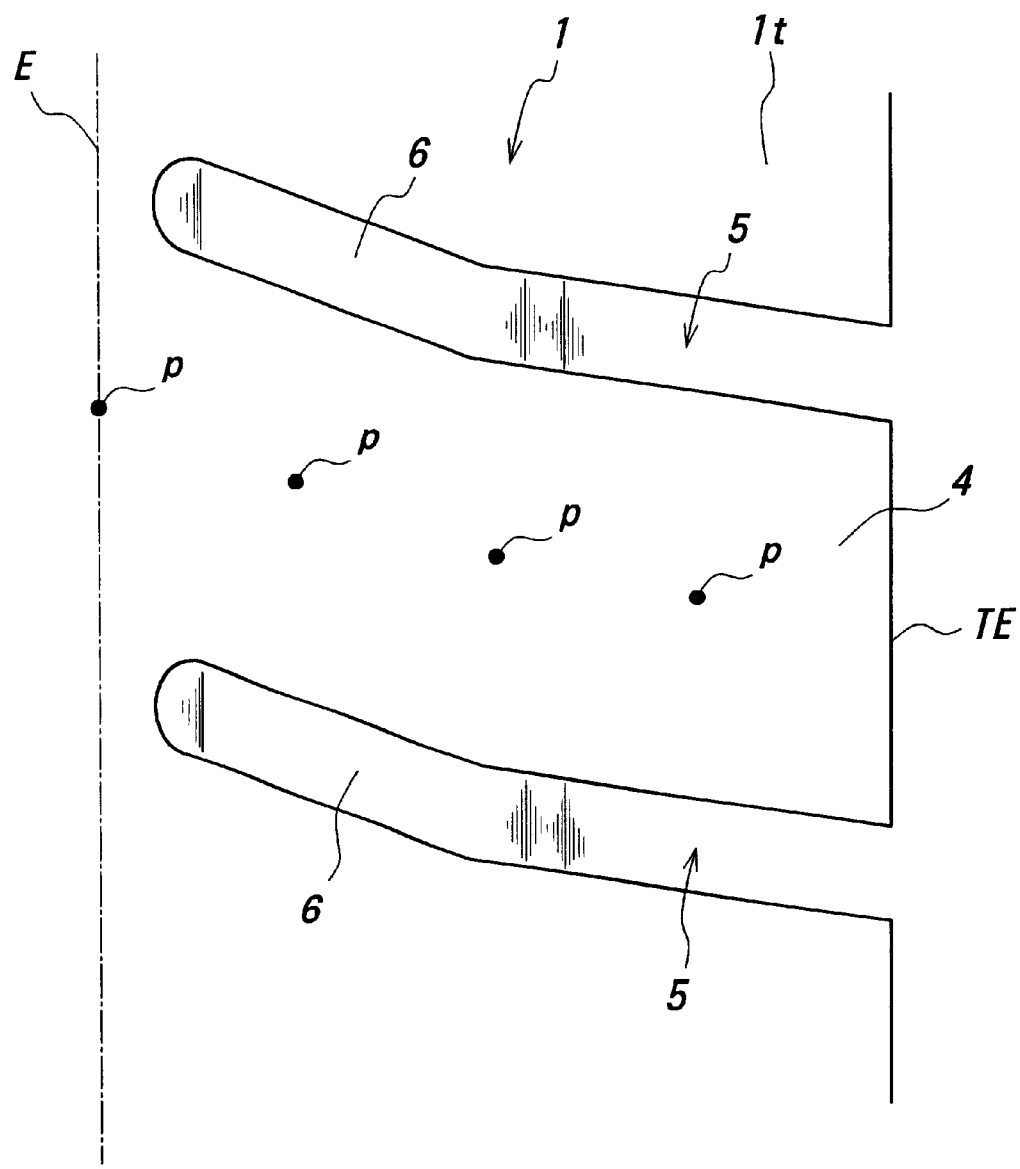
FIG. 3 is a developed view of a right-half ground contact face in the tire shown in FIG. 1.

Referring to FIGS. 1–3, the heavy duty pneumatic radial tire according to the invention comprises a tread portion 1, a pair of sidewall portions (not shown) and a pair of bead portions (not shown). And also, the tire comprises a radial carcass (not shown) comprised of at least one rubberized ply extending between a pair of bead cores (not shown) embedded in the respective bead portions to reinforce the above portions and a belt 2 disposed on an outer periphery of the radial carcass to reinforce the tread portion 1.

The tread portion 1 has a lug pattern defined by many lugs 4 (see FIG. 3) formed in a tread rubber 3 on both sides with respect to an equatorial plane E of the tire and is provided with lug grooves 5 for the formation of the lugs. For convenience sake, the lug groove 5 extending in a direction of the rotating axial line of the tire is shown in FIGS. 1 and 2, but the lug groove according to the invention may include a lug groove extending obliquely with respect to the above axial line as shown in FIG. 3, and a lug groove extending zigzag.

The lug groove 5 is extended from a position separated from the equatorial plane E of the tire by a width Lo corresponding to 3–15% of the ground contact width up to each end of the tread portion 1 and opened at such a tread end.

The lug groove 5 shown in FIG. 1 has a platform 6 on a continuous region ranging from a top end portion near to the equatorial plane E to a central portion in a longitudinal direction of the lug groove 5 and connecting the top end portion to the central portion.

The lug groove 5 shown in FIG. 2 has a first platform 7 and a second platform 8 on a division region ranging from the top end portion near to the equatorial plane E to the central portion in the longitudinal direction of the lug groove 5 and separated the top end portion and the central portion from each other.

And also, the platform 6 shown in FIG. 1, and the platforms 7, 8 shown in FIG. 2 have such a surface shape that a groove depth at the top end portion in the lug groove 5 is made shallower than a groove depth at the central portion in the lug groove 5, respectively.

That is, the formation of the lug groove 5 is started from the position separated from the equatorial plane E of the tire by the width $L_0$ corresponding to 3–15% of the ground contact width, and the platform 6, 7 is formed at the top end portion of the lug groove 5, and the surface shape of the platform 6, 7 is rendered into a shape that the groove depth at the top end portion in the lug groove 5 is made shallower than the groove depth at the central portion in the lug groove 5, whereby a central zone of the tread portion 1 causing the concentration of driving torque can be strengthened in the circumferential direction and the occurrence and growth of crack at the bottom of the lug groove 5 can be controlled. This is not depended by the size in radius of curvature at the section of the groove bottom.

Further, the platform 6 or 8 is arranged in the continuous region or the division region on the central portion of the lug groove, whereby a wearing volume is increased in the central portion of the lug groove 5 easily creating chunk-out of a lug 4 at a middle to last wearing stage of the tread rubber 3, so that the occurrence of the chunk-out can largely be reduced and the wear life can be prolonged.

Even when the platform 6 or 7, 8 is arranged, the lug groove 5 itself is existent, so that an adequate traction performance can be developed. Furthermore, it is not required to increase a gauge of a skid base SB between the groove bottom and the belt 2, so that the resistance to heat build-up is not damaged and there is no fear of creating troubles in the belt 2 and the tread rubber 3 due to higher temperature.

The platform 6 shown in FIG. 1 has a surface shape that the groove depth of the lug groove 5 is gradually increased over a region ranging from a start end $S_E$ of the top end portion of the lug groove 5 to an upper edge of a terminal end $E_E$ (approaching to the end of the tread portion 1) in the central portion of the lug groove 5. Thus, the above effect becomes more conspicuous.

In FIGS. 1 and 2, the platform 6 or 7 is actually existent in the top end portion of the lug groove 5 so that a ratio of distance $L_1$ (mm) on a vertical line drawn from the position A of the top end of the lug groove to the tread end TE to a vertical distance L (mm) ranging from the position A of the top end of the lug groove 5 to the tread end TE corresponding to an end of a ground contact width in a ground contact face 1t of the tread portion 1 is within a range of 0.1–0.2.

In the platform 6, 7 existing within the ratio $L_1/L$ of 0.1–0.2 in the lug groove 5, a ratio of height $h_1$ (mm) of the platform from a bottom line BL of the lug groove to height $H_1$ from the bottom line BL to the ground contact face 1t on a normal line drawn to the ground contact face 1t is within a range of 0.2–0.6.

And also, the platform 6, 8 located on the continuous region or the division region at the side of the central portion is actually existent in such a place that a ratio of distance $L_2$ (mm) on a vertical line drawn from the position A of the top end of the lug groove 5 to the tread end TE to the above vertical distance L is within a range of 0.2–0.5.

In the platform 6, 8 existing within the ratio $L_2/L$ of 0.2–0.5 in the lug groove 5, a ratio of height $h_2$ (mm) of the platform from the bottom line BL of the lug groove 5 to height $H_2$ (mm) from the bottom line BL to the ground contact face 1t on a normal line drawn to the ground contact face 1t is within a range of 0.1–0.4. Moreover, the heights $H_1$, $H_2$ are measured on the normal line drawn to the ground contact face 1t.

The term "bottom line BL" used herein means a line smoothly connecting a bottom position of a groove depth NSD (mm) on the equatorial plane E of the tire defined by a design guide or the like every kind and size of tire to a groove bottom line shown by a solid line. In FIGS. 1 and 2 is shown the bottom line BL based on the combination of the solid line with a phantom line beneath the platforms 6, 7 and 8.

When the ratio $h_1/H_1$ exceeds 0.6 and the ratio $h_2/H_2$ exceeds 0.4, the crack resistance at the bottom of the lug groove 5 and the resistance to chunk-out of the lug 4 are improved, but the volume of the lug groove 5 is lacking and the traction performance is considerably lowered.

On the other hand, when the ratio $h_1/H_1$ is less than 0.2 and the ratio $h_2/H_2$ is less than 0.1, the desired improvement on the crack resistance at the bottom of the lug groove 5 and the resistance to chunk-out of the lug 4 is not obtained.

The following examples are given in illustration of the invention and are not intended as limitations thereof.

There are manufactured six radial ply tires for construction vehicle having a tire size of 40.00R57, E-4 (Rock Deep Tread) ☆☆, one of which tires is a tire of Example 1 having a platform 6 shown in FIG. 1 and the other tires are tires of Examples 2–6 having platforms 7, 8 shown in FIG. 2. For the comparison, there are provided a conventional tire having the same structure as in Example 2 except that only the platform 7 is formed in the lug groove, and a comparative tire having the same structure as in the conventional tire except that a gauge of skid base SB is increased by 50% as compared with the conventional tire.

With respect to the example tires, conventional tire and comparative tire, the skid base gauge (SBG), ratio $h_1/H_1$ and ratio $h_2/H_2$ are shown in Table 1. Moreover, the skid base gauge (SBG) in Table 1 is represented as 0.2NSD or 0.3NSD obtained by multiplying groove depth NSD by a numerical value.

Each of the above tires is subjected to the following five tests.
(1) Crack Resistance at Groove Bottom, Resistance to Chunk-Out The tire is assembled onto an applied rim of 29.00/6.0 and inflated under a maximum air pressure of 7.00 kgf/cm². A pair of such tires are mounted on each end portion of a rear driving shaft of a super-large dump truck and run at a speed of 20–40 km/h until the remaining groove depth is rendered into 20% of a groove depth in a new tire to measure a crack length created at the bottom of the lug groove 5. The measured result is represented by an index on the basis that the conventional tire is 100, wherein the smaller the index value, the better the property. At the same time, resistance to chunk-out is evaluated by a chunking degree of rubber lump. The chunking degree is visually divided into three ranks of "large", "middle" and "small".
(2) Wear Resistance It is evaluated by the above actual running test, wherein the evaluation is carried out at the remaining groove depth corresponding to 20% of the groove depth in the new tire.
(3) Traction Performance It is evaluated by a 100-point method as a feeling of an operator for the super-large dump truck. Among evaluation points, 100–80 points are no-problem level, and 70–60 points are a level that the traction is lacking, and 50–40 points are a level of requiring an adjustment of vehicle speed.
(4) Resistance to Heat Build-up The tire is assembled onto an applied rim of 29.00/6.0, inflated under a maximum air pressure of 7.00 kgf/cm², pushed onto a drum rotating at a surface speed of 10 km/h under a load of 60000 kgf corresponding to a maximum load capacity and continuously run thereon for 24 hours to measure a tire temperature. The measurement is carried out by inserting thermo-couples into 7 holes p formed at even intervals (shown in FIG. 3) in a widthwise direction of the tread portion 1 to measure a temperature in the vicinity of an outermost layer of the belt 2. The measured results are summarized as an average temperature of seven points p, which is evaluated by a value of ± to a standard value when the average temperature of the conventional tire is standard. The larger the plus value, the worse the property.

Moreover, the above applied rim, maximum air pressure and maximum load capacity are according to the definitions of JATMA YEAR BOOK 1999.

The results of the five tests are also shown in Table 1.

TABLE 1

| Items | Conventional Example | Comparative Example | Example 1 | Example 2 | Example 3 | Example 4 | Example 5 | Example 6 |
|---|---|---|---|---|---|---|---|---|
| Applied figure | — | — | FIG. 1 | FIG. 2 | FIG. 2 | FIG. 2 | FIG. 2 | FIG. 2 |
| Skid base gauge | 0.2 NSD | 0.3 NSD | 0.2 NSD | 0.2 NSD | 0.2 NSD | 0.2 NSD | 0.2 NSD | 0.2 NSD |
| Ratio $h_1/H_1$ | 0.50 | 0.50 | 0.50 | 0.50 | 0.20 | 0.60 | 0.50 | 0.50 |
| Ratio $h_2/H_2$ | — | — | 0.30 | 0.30 | 0.30 | 0.30 | 0.10 | 0.40 |
| Crack resistance (index) | 100 | 110 | 120 | 120 | 100 | 132 | 100 | 135 |
| Resistance to chunk-out | large | middle | small | small | small | small | small | small |
| Traction performance (evaluation point) | 100 | 80 | 85 | 85 | 100 | 80 | 95 | 80 |
| Wear resistance (index) | 100 | 105 | 110 | 105 | 100 | 105 | 100 | 105 |
| Resistance to heat build-up (° C.) | ±0 | +6 | ±0 | ±0 | −1 | ±0 | ±0 | ±0 |

As seen from Table 1, the crack resistance at the bottom of the lug groove 5 and the resistance to chunk-out are considerably improved in all of the examples tires as compared with the conventional tire while maintaining the resistance to heat build-up, wear resistance and traction performance at the same level as in the conventional tire.

As mentioned above, according to the invention, there can be provided heavy duty pneumatic radial tires advantageously improving the crack resistance at the bottom of the lug groove and the resistance to chunk-out of the lug while maintaining the excellent traction performance and resistance to heat build-up inherent to the conventional tire.

What is claimed is:

1. A heavy duty pneumatic radial tire comprising: a tread portion a lug pattern formed on both sides of said tread portion, lug grooves forming lugs extending from a position separated from an equatorial plane of the tire by a width $L_0$ corresponding to 3–15% of a ground contact width up to each of both ends of the tread portion and opened at a tread end, each of said lug grooves having two separated platforms each raised from a bottom of the lug groove, one platform being located at a top end portion near the equatorial plane and a second platform being located at a central portion in a longitudinal direction of the lug groove and separated from said first platform, and said platforms have a surface shape such that a depth of the lug groove at the top end portion is shallower than a groove depth at the central portion, each platform extending across the entire width of the lug groove,
   wherein the one platform is existent in such a place that a ratio $L_1/L$, where $L_1$ is a distance on a vertical line drawn from the position of the top end of the lug groove to an end of the one platform and L is a vertical distance ranging from the position of the top end of the lug groove to the tread end corresponding to an end of a ground contact width in a ground contact face of the tread portion, is within a range of 0.1–0.2 and satisfies such a condition that a ratio $h_1/H_1$, where $h_1$ is a height of the platform from a bottom line of the lug groove and $H_1$ is a height from the bottom line to the ground contact face on a normal line drawn to the ground contact face, is within a range of 0.2–0.6; and wherein the second platform is existent in such a place that a ratio $L_2/L$, where $L_2$ is a distance on a vertical line drawn from the position of the top end of the lug groove to a terminal end of the second platform and L is a vertical distance ranging from the position of the top end of the lug groove to the tread end corresponding to an end of a ground contact width in a ground contact face of the tread portion, is within a range of 0.2–0.5 and satisfies such a condition that a ratio $h_2/H_2$, where $h_2$ is a height of the second platform from a bottom line of the lug groove and $H_2$ is a height from the bottom line to the ground contact face on a normal line drawn to the ground contact face, is within a range of 0.1–0.4.

2. A heavy duty pneumatic radial tire according to claim 1, wherein the one platform has such a surface shape that the groove depth of the lug groove is gradually increased from a start end of the top end portion toward a point at which the one platform is separated from the second platform.

* * * * *